United States Patent [19]

Fischer

[11] 4,377,650

[45] Mar. 22, 1983

[54] PROCESS FOR THE PREPARATION OF COLORED POWDERS OF HYDROLYZED ETHYLENE-VINYL ACETATE COPOLYMER

[75] Inventor: Joseph Fischer, Cincinnati, Ohio

[73] Assignee: National Distillers & Chemical Corp., New York, N.Y.

[21] Appl. No.: 202,559

[22] Filed: Oct. 31, 1980

[51] Int. Cl.$^3$ .................... C08J 3/20; C08K 3/22; C08K 5/08; C08K 5/34
[52] U.S. Cl. ................................ 524/88; 524/106; 524/260; 524/286; 524/290; 524/292; 524/358; 524/407; 524/413; 524/418; 524/420; 524/424; 524/430; 524/431; 524/432; 524/563; 524/581
[58] Field of Search ................ 260/42.51, 42.53; 524/88, 106, 260, 286, 290, 292, 358, 407, 413, 418, 420, 424, 430, 431, 432, 563, 581

[56] References Cited

U.S. PATENT DOCUMENTS

| | | | |
|---|---|---|---|
| 3,449,291 | 6/1969 | Lerman et al. | 260/42.21 |
| 3,636,136 | 1/1972 | Konopik | 260/42.51 |
| 3,669,922 | 6/1972 | Bartsch | 260/42.21 |
| 3,674,736 | 7/1972 | Lerman et al. | 260/42.21 |
| 3,976,618 | 8/1976 | Takida et al. | 260/42.51 |
| 4,119,687 | 10/1978 | Resz et al. | 260/42.51 |

Primary Examiner—Paul Lieberman
Assistant Examiner—Robert E. L. Sellers
Attorney, Agent, or Firm—Kenneth D. Tremain

[57] ABSTRACT

Pigment is finely dispersed in hydrolyzed ethylene-vinyl acetate copolymer by subjecting the copolymer to which pigment has previously been added by simple, non-intensive mixing to solution hydrolysis and/or by adding pigment to the solution hydrolysis medium prior to or during hydrolysis of the copolymer therein.

9 Claims, No Drawings

PROCESS FOR THE PREPARATION OF COLORED POWDERS OF HYDROLYZED ETHYLENE-VINYL ACETATE COPOLYMER

BACKGROUND OF THE INVENTION

1. Field of the Invention

This invention relates to the field of hydrolyzed ethylene-vinyl acetate copolymer and, more particularly, to the field of processes for finely dispersing colorant in hydrolyzed ethylene-vinyl acetate copolymer.

2. Description of the Prior Art

Although there exists a large market for transparent, clear colorless polymers, the use of color in plastic moldings, profile extrusions, sheetings, film and pipe is often highly desirable from the standpoint of consumer appeal and can even be essential for some product applications. For example, plastic housings for most consumer goods are colored for aesthetic reasons. In the case of wire and cable insulation, it is common to incorporate carbon black into a base resin such as polyethylene in order to prevent or retard degradation caused by weathering. Colored resins such as polyvinylchloride are used not only for their attractive appearance and maintenance-free characteristics, the colorants dispersed therein help to protect the resins from the destructive effects of ultraviolet radiation.

Inorganic and some organic based coloring agents are commonly used to color polymeric materials since they can withstand processing temperatures often ranging from about 120° C. to about 350° C., and possess good stability to sunlight, rain and other atmospheric conditions. Colorants such as carbon black, titanium dioxide, phthalocyanine blue, phthalocyanine green, and the like, are generally dispersed within thermoplastic resins by intensively mixing the resins with the requisite amount of colored matter in heated processing equipment such as roller mills, compounding extruders, Banbury mixers, sigma blade mixers, and the like. Both the appearance of the resins and the color values for given amounts of coloring agent can be improved to the extent finer dispersions of colorant particles in the resins are attained. Because many types of colorants including those aforementioned are difficult to disperse in resins, special compounding techniques must often be employed to achieve acceptable dispersions. Specialty processors often offer pigment concentrates and masterbaches to simplify to some extent the process of providing pigmentation with good, speck-free, uniform dispersion characteristics. Regardless of the procedure used, intensive mixers and other massive processing equipment are costly to purchase and in operation consume relatively large quantities of energy. This being the case, coloration costs are generally significantly greater than the mere cost of the colorant material.

Hydrolyzed ethylene-vinyl acetate copolymers constitute an important class of thermoplastic resins known for their excellent stability, good barrier properties and ease of processing. When these copolymers are to be colored, it is the usual practice to incorporate the coloring agent into the resins employing techniques of intensive mixing whose disadvantages have been commented upon above. While it is known that colored particles of ethylene-vinyl acetate copolymer can be prepared by dispersing the copolymer in an aqueous medium containing surface active agent (cf. U.S. Pat. Nos. 3,449,291 and 3,674,736 to Lerman et al. and U.S. Pat. No. 3,669,922 to Bartsch et al.), heretofore no attempt has been made to finely disperse colorant in hydrolyzed ethylene-vinyl acetate copolymer in the course of production of the latter by known and conventional solution hydrolysis procedures such as described in U.S. Pat. Nos. 2,386,347 and 2,399,653 to Roland, Jr., 2,396,210 and 2,434,179 to Sharkey, 2,403,464 to Smith, 2,451,963 to Loder, 3,344,129 to Bestian and 3,386,978 to Salyer.

SUMMARY OF THE INVENTION

In accordance with the present invention, a coloring agent is very finely dispersed in hydrolyzed ethylene-vinyl acetate copolymer without resort to intensive mixing methods by carrying out solution hydrolysis upon an ethylene-vinyl acetate copolymer to which the coloring agent has previously been added by simple, non-intensive mixing and/or by adding coloring agent to the solution hydrolysis medium prior to or during the hydrolysis of the ethylene-vinyl acetate copolymer therein. It is altogether surprising that the particles of hydrolyzed ethylene-vinyl acetate copolymer which are subsequently recovered will have taken up effective quantities of coloring agent from the solution hydrolysis medium and that the coloring agent will have been very finely dispersed in the resin particles. Thus, employing the process herein, it is possible to obtain the same results achieved with the use of intensive mixing but without the high cost and energy consumption associated with the latter.

DESCRIPTION OF THE PREFERRED EMBODIMENTS

The term "hydrolyzed ethylene vinyl-acetate copolymer" shall be understood to refer to a copolymer of ethylene and vinyl acetate derived from the copolymerization of from about 20 to about 95 weight percent ethylene, from about 5 to about 80 weight percent vinyl acetate and optionally, up to about 15 weight percent not exceeding the weight amount of vinyl acetate of one or more other ethylenically unsaturated monomers copolymerizable with ethylene and vinyl acetate, with from 5 to 100 weight percent of the copolymerized ethylene vinyl acetate units and, if present, other vinyl ester units present in the copolymer being hydrolyzed to vinyl alcohol units.

The terms "solution hydrolysis" and "solution hydrolysis medium" shall be understood respectively to refer to any known and conventional procedure for the hydrolysis of ethylene-vinyl acetate dissolved in an organic solvent medium and the reaction medium in which such hydrolysis is conducted. Solution hydrolysis procedures and solution hydrolysis media which can be used in the process of this invention are described in U.S. Pat. Nos. 2,386,347 and 2,399,653 to Roland, Jr., 2,396,210 and 2,434,179 to Sharkey, 2,403,464 to Smith, 2,451,963 to Loder, 3,344,129 to Bestian and 3,386,978 to Salyer, the disclosures of which are incorporated by reference herein. Briefly stated, the foregoing solution hydrolysis processes call for hydrolyzing ethylene-vinyl acetate copolymer at elevated temperature in a liquid reaction medium containing a sufficient amount of organic solvent to fully dissolve the copolymer, a primary alcohol and an acid or alkaline hydrolysis catalyst. Reaction of acetate and any other ester moieties present in the copolymer with the primary alcohol converts such moieties to hydroxyl groups, the reaction being carried out for a period of time sufficient to provide the desired degree of hydrolysis. Suitable organic solvents are the aromatic hydrocarbons which remain inert during the hydrolysis reaction such as benzene, toluene, xylene, butylbenzene, ethylbenzene, isopropylbenzene, etc., and mixtures thereof. Of the foregoing, toluene is especially preferred. The primary alcohol can be any of the lower saturated paraffinic alcohols such as methanol, ethanol, propanol, isopropanol, n-butanol, sec-butanol, tert-butanol, and mixtures thereof, with methanol being especially preferred. Useful acidic catalysts include mineral acids such as hydrochloric acid and sulfuric acid. Suitable alkaline catalysts include hydroxides, oxides or strongly alkaline salts of the alkali metals such as sodium hydroxide, potassium hydroxide, sodium oxide, sodium carbonate, sodium acetate, etc. The alkali metal may also be present in the form of the alcoholate such as sodium methylate and sodium ethylate. In a preferred hydrolysis procedure, sodium metal dissolved in an excess of methanol to provide a methanolic solution of sodium methylate is added to a solution of ethylene-vinyl acetate copolymer in toluene with reflux of the resulting medium for from 15 minutes to 12 hours at from about 40° C. to about 80° C. The hydrolyzed resin is readily recovered from the reaction medium in the form of a powder by filtration or other appropriate technique, and following one or more washings, is dried, preferably under vacuum at elevated temperature.

The coloring agents which can be incorporated in the ethylene-vinyl acetate resins in accordance with this invention can be inorganic in nature, for example one or more metal oxides selected from the group consisting of titanium, zinc, iron, chromium, lead, aluminum, nickel; and/or a chromate, sulfide, sulfoselenide, ferrocyanide, silicate, carbon black, or any mixture of the foregoing.

Organic coloring agents include the phthalocyanines such as phthalocyanine blue or green, the beta-naphthol derivatives, chloronitroaniline, pyrazalone, arylides of naphthoic acid or acetoacetic acid, the anthraquinones and the alizarins. The coloring agent can be present in the hydrolyzed ethylene-vinyl acetate copolymer at a level of from about 0.1 to about 80 weight percent of the resin, and preferably at a level of from about 0.5 to about 20 weight percent of the resin. The coloring matter can be added either indirectly to the solution hydrolysis medium through having been first incorporated in the starting ethylene-vinyl acetate copolymer by such simple, non-intensive mixing procedures as blending on a two-roll mill, or in a compounding extruder, Banbury mixer, sigma blade mixer or similar apparatus, or directly in the solution hydrolysis medium before or during hydrolysis of the ethylene-vinyl ester copolymer therein.

The following examples are further illustrative of the process of this invention, with Example I serving as a control.

EXAMPLE I

Hydrolysis without Coloring Agent

Pellets of an ethylene-vinyl acetate copolymer containing 18.62% weight copolymerized vinyl acetate were fully hydrolyzed according to the following procedure:

The materials employed in the reaction were:

| | |
|---|---|
| Ethylene-Vinyl Acetate Copolymer | 125 gms. |
| Toluene | 600 ml. |

| -continued | |
|---|---|
| Catalyst Solution | 175 ml. |

The toluene was placed in a 2 liter, 3 necked, round bottom flask equipped with an agitator, condenser, and thermometer. Heat was supplied by an oil bath mounted on an electric hot plate. The copolymer was added, with agitation, under nitrogen, and then heated to 90°–100° C. with stirring being continued for 20 minutes after solution was completed. The clear, colorless solution was cooled to 70° C. and 175 ml. of catalyst solution was prepared by dissolving 0.64 g. sodium metal in 200 ml. methanol.

The catalyzed mixture was refluxed for 3 hours at 63°–64° C.; 500 ml. methanol was then added over a 20 minute period, maintaining reflux. The mixture was cooled to 30° C., filtered, and the product washed twice, using 300 ml. of methanol each time. The white, granular powder was vacuum dried at 55° C. for about 12 hours.

The yield of hydrolyzed ethylene-vinyl acetate copolymer was 99% of theoretical and the resin contained 0.55% vinyl acetate.

EXAMPLE II

The procedure and materials for this preparation were the same as those of Example I except that the starting ethylene-vinyl acetate copolymer contained 2 parts $TiO_2$ per 100 parts of resin. The $TiO_2$ was incorporated in the copolymer prior to hydrolysis by simple, non-intensive mixing on a two-roll mill and the product was granulated prior to solution. The resulting solution was uniformly white, and remained so for the duration of the hydrolysis. The product filtered easily and a white, granular powder of hydrolyzed ethylene-vinyl acetate copolymer having finely dispersed $TiO_2$ therein was obtained.

The yield of resin was 98% of theoretical and the product contained 0.58% vinyl acetate.

EXAMPLE III

The procedure and materials for this preparation were the same as those of Example I except that 2.5 gms. of $TiO_2$ were added to the toluene in the flask before the ethylene-vinyl acetate copolymer was added. The $TiO_2$ initially settled out, but remained suspended after solution of the ethylene-vinyl acetate copolymer was completed. The solution was milky white, with some powder observed in the solution after adding 370 ml. of methanol. The product filtered easily, and a white, granular powder of hydrolyzed ethylene-vinyl acetate copolymer having finely dispersed $TiO_2$ therein was obtained.

The yield of resin was 98% of theoretical and the product contained 0.49% vinyl acetate. Visual comparison of a pressed plaque showing the white $TiO_2$ hydrolized resin of Example II (milled $TiO_2$) and a plaque prepared from the resin of this example demonstrated that the pigmented product can be prepared by either of the processes described in said examples with good results.

EXAMPLE IV

The procedure and materials for this preparation were the same as those of Example I except that the ethylene-vinyl acetate copolymer contained 2% by weight of Diarylide Yellow. The yellow coloring agent was incorporated in the ethylene-vinyl acetate copolymer on a two-roll mill, and the product was granulated prior to being dissolved in the toluene. After 250 ml. of methanol were added, some powder and granules were observed in the solution. The product filtered easily, and a bright yellow, granular hydrolyzed ethylene-vinyl acetate copolymer powder having the Diarylide Yellow finely dispersed therein was obtained.

The yield of resin was 97% of theoretical and the product contained 0.72% vinyl acetate.

EXAMPLE V

The procedure and materials for this preparation were the same as for those of Example I except that the ethylene-vinyl acetate copolymer contained 1% by weight of Sunfast Peacock Blue. The blue pigment was incorporated in the ethylene-vinyl acetate copolymer on a two-roll mill, and the product was granulated prior to solution. Some solid product was observed on the wall of the flask after the hydrolysis step, and some granules were observed after the methanol addition. The product filtered easily and a resin powder was obtained with the blue colorant finely dispersed therein.

The yield of resin was 98% of theoretical and the product contained 2.99% vinyl acetate. Visual comparison of the product synthesized in accordance with this example and a product prepared by milling with Sunfast Peacock Blue (phthalocyanine blue) demonstrated that the color of the synthesized product was much deeper than that of the milled sample thus indicating much better color value was obtained from the pigment. In addition the milled sample had streaks of pigment agglomerates which were clearly visible, a typical result with difficult-to-disperse pigments such as phthalocyanine blue.

EXAMPLE VI

The procedure and materials for this preparation were the same as those of Example I except that 0.63 grams of FD&C Red #3 aluminum lake pigment were added to the toluene in the flask before the ethylene-vinyl acetate copolymer was added. Some white, solid material was observed on the wall of the flask during the hydrolysis step, and powder was present during the methanol addition. After 70% of the methanol was added, the product coalesced into a solid mass before crumbling into small particles. The product filtered easily, and a coarse, granular powder of hydrolyzed ethylene-vinyl acetate copolymer varying in color from very light to dark pink was obtained.

The yield of resin was 97% of theoretical and the product contained 2.02% vinyl acetate.

EXAMPLE VII

The procedure and materials for this preparation were the same as those of Example I except that the ethylene-vinyl acetate copolymer contained 1% by weight of Sunfast Green (phthalocyanine green), a pigment known to be of relatively difficult dispersability. The green pigment was incorporated in the ethylene-vinyl acetate copolymer on a two-roll mill, and the product was granulated prior to solution. Some green solid material was observed on the wall of the flask prior to the addition of the methanol. Green granules were present after 80% of the methanol was added. The hydrolyzed ethylene-vinyl acetate copolymer filtered easily, and the product obtained was green in color, ranging in size from powders to small crumbs.

The yield of resin was 98.5% of theoretical, and the product contained 0.85% vinyl acetate. Visual comparison of the color of the pressed product of this example with that of a milled sample of the same pigment, showed the former to be a darker green and therefore better dispersed. This was also seen in the pigment particles visible in the milled sample.

What is claimed is:

1. A process for the preparation of colored particles of hydrolyzed ethylene-vinyl acetate copolymer in the absence of intensive mixing methods which comprises hydrolyzing ethylene-vinyl acetate copolymer in solution in the presence of coloring agent, said coloring agent being present in the ethylene-vinyl acetate copolymer prior to hydrolysis of the latter, and thereafter recovering the hydrolyzed ethylene-vinyl acetate copolymer in the form of particles having coloring agent finely dispersed therein.

2. The process of claim 1 wherein the coloring agent is an inorganic coloring agent.

3. The process of claim 2 wherein the inorganic coloring agent is at least one oxide of a metal selected from the group consisting of titanium, zinc, iron, chromium, lead, aluminum, nickel; a chromate, sulfide, sulfoselenide, ferrocyanide, silicate, carbon black, or any mixture thereof.

4. The process of claim 1 wherein the coloring agent is an organic coloring agent.

5. The process of claim 4 wherein the organic coloring agent is at least one member of the group consisting of the phthalocyanines, the beta-naphthol derivatives, chloronitroaniline, pyrazalone, arylides of naphthoic acid or acetoacetic acid, the anthraquinones and the alizarins, 6. The process of claim 5 wherein the phthalocyanine coloring agent is phthalocyanine blue or phthalocyanine green.

7. The process of claim 1 wherein the coloring agent is present in the hydrolyzed ethylene-vinyl acetate copolymer at a level of from about 0.1 to about 80 weight percent.

8. The process of claim 7 wherein the coloring agent is present in the hydrolyzed ethylene-vinyl acetate copolymer at a level of from about 0.1 to 20 weight percent.

9. The process of claim 2 wherein the coloring agent has been added to the ethylene-vinyl acetate copolymer by simple, non-intensive mixing.

* * * * *